United States Patent [19]
Ingalls

[11] 3,850,252
[45] Nov. 26, 1974

[54] PLOW MOLD BOARD

[76] Inventor: James A. Ingalls, R.R. 1, Joliet, Ill. 60431

[22] Filed: Aug. 20, 1973

[21] Appl. No.: 390,072

[52] U.S. Cl. .............................. 172/760, 172/771
[51] Int. Cl. .......................................... A01b 15/08
[58] Field of Search ........... 172/719, 754, 756, 759, 172/760, 761, 765, 771, 758

[56] References Cited
UNITED STATES PATENTS

| | | | |
|---|---|---|---|
| 592,858 | 11/1897 | Anderson | 172/761 |
| 991,810 | 5/1911 | Whiting | 172/760 |
| 2,757,594 | 8/1956 | Tanke | 172/754 |
| 2,908,339 | 10/1959 | Cook | 172/754 |
| 2,948,346 | 8/1960 | Sheppard | 172/754 |
| 3,153,457 | 10/1964 | Van Der Lely | 172/756 |

*Primary Examiner*—Robert E. Pulfrey
*Assistant Examiner*—Paul T. Sewell

[57] ABSTRACT

An improved mold board for a plow provided with a plurality of bead like transversely projecting diagonally extending projections formed integrally therewith on the ground engaging surface thereof and sloping from the top end to the bottom end in the direction of travel of the mold board in a manner to reduce the surface friction between the mold board and the ground surface. Further, the mold board may have an undulatory horizontal cross-section with such undulations projecting diagonally forward in the direction of travel of the mold board from the top end to the bottom end thereof.

6 Claims, 4 Drawing Figures

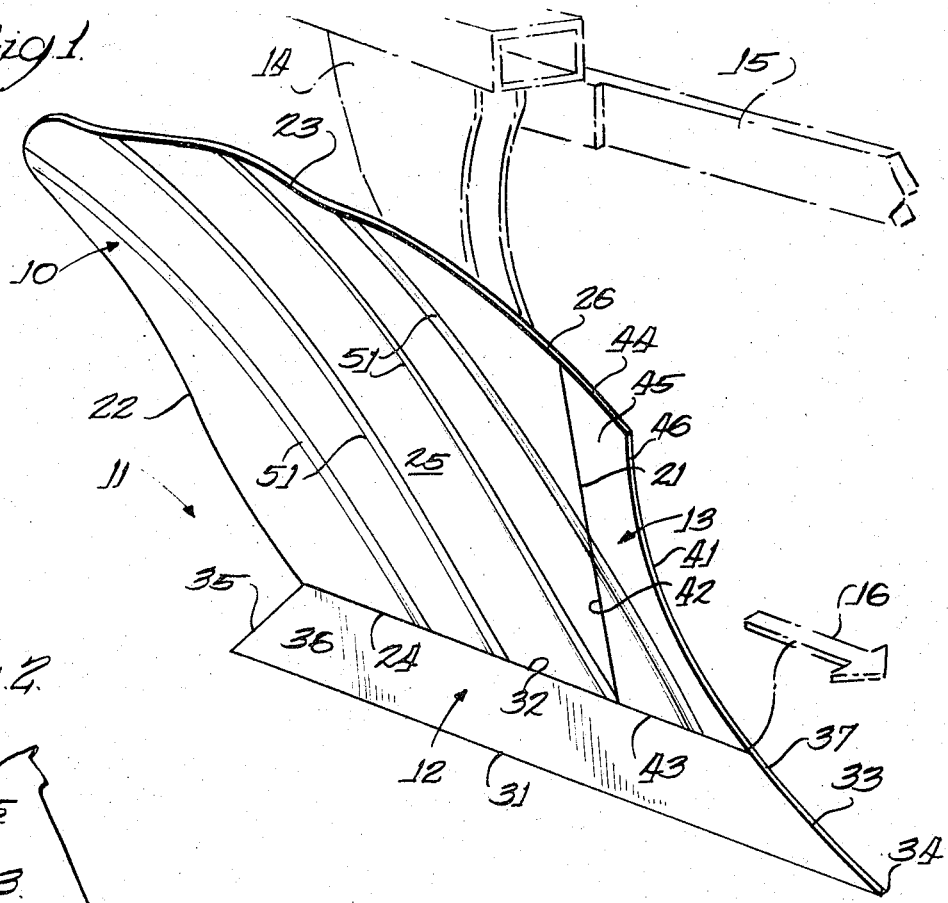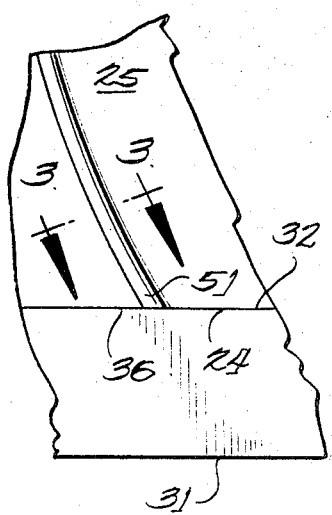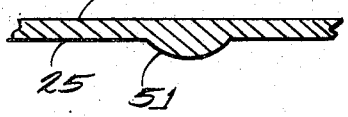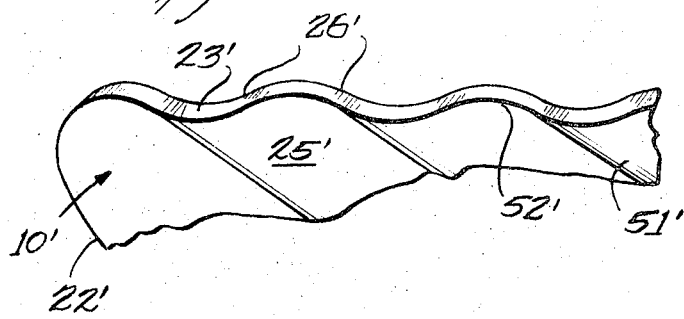

PLOW MOLD BOARD

BACKGROUND OF THE INVENTION

1. Field of the Invention

This invention relates generally to plows and more particularly to an improved mold board of a plow having an undulated ground engaging surface to reduce the sliding friction incurred when the mold board engages the ground to be tilled.

2. Description of the Prior Art

In the plowing of a field, it is required that the number of plows pulled behind a tractor be carefully sized for the pulling power of the tractor due to the high amount of frictional contact incurred between the plow blades and the ground. The highest amount of frictional contact is incurred at the mold board of the plow which must engage with great force against the side of the plowed furrow to accomplish uniform soil fracturing of the furrow slice in a manner to throw a smooth unbroken furrow behind the plow blade as it is pulled through the ground.

As the forces encountered by the plows as they are pulled through the ground requires a certain pulling force on the part of a tractor or other device doing the pulling, it is required that only those number of plows be pulled at one time behind a tractor for which the tractor has suitable power for pulling the same. Thus, if an individual has a tractor designed for pulling a three plow hitch, it would not be feasible to attempt to pull a four plow hitch therebehind as the tractor would not have sufficient power therefor.

As the mold board of the plow provides the greatest area of sliding frictional engagement with the ground, it would be desirable to reduce the frictional engagement thus reducing the amount of pulling force required to pull the plow through the ground so that it would be possible to increase the speed of the pulling tractor during the plowing operation, or alternatively, to make it feasible to utilize a four plow hitch where only a three plow hitch was previously possible due to the pulling power of the tractor.

While this problem has somewhat been recognized in the prior art, attempts at reducing the sliding friction of mold boards have not met with success in view of the necessity that the mold board be of a strong material having a specific curve thereto permitting the mold board to throw a smooth unbroken furrow behind the plow. Prior art devices include a plow mold board having a series of rotatably mounted cylindrical members journaled in the ends of slots cut in the mold board such that the rows will rotate during the forward pulling of the mold board through the ground to reduce the sliding friction therebetween, with other devices providing endless moving belts, bands, chains, and the like in the surface of the mold board which all attempt to minimize the normal sliding friction by providing some type of rotating or moving surface for engaging the ground in a manner to reduce the frictional contact therewith. However, all of such devices have failed to provide a satisfactory solution to the problem as operation of the mold boards is under an adverse condition with the ground containing rocks, roots, gravel and the like which soon either jam the devices fixed to the mold board in a manner to prevent the operation thereof, or which provide such a high degree of wear and tear on such devices that the same soon become inoperable, thus requiring frequent repair, maintenance and replacement with the associated costs and plow-down time during which the plow cannot be utilized. Further, it is to be understood that when such devices become inoperable during a plowing operation, they then prevent the continued plowing of the ground until after the same are repaired as, when inoperable, such devices serve to greatly increase the frictional contact with the ground rather than reduce the same, thus making it unfeasible to continue the plowing operation as the force required to pull the plows with the inoperable mold board devices is normally much greater than the pulling power available on the pulling tractor.

Further, such prior art devices require mounting apertures or the like in the mold board which, when being pulled through the ground, soon become clogged with dirt, rocks or the like thus forming an obstruction in the mold board surface preventing proper uniform soil fracturing of the furrow slice.

It would thus be desirable to provide a mold board which, when pressed with the great force required against the side of the sliced furrow would turn over the split and lifted soil in the same manner as a conventional mold board but would reduce the great sliding friction against the ground thereby requiring less pulling power on the part of the tractor or otherwise permitting the tractor to conduct the plowing operation at a higher rate of speed.

SUMMARY OF THE INVENTION

The present invention remedies and overcomes all of the foregoing deficiencies and disadvantages of presently available mold boards by providing a novel mold board reducing the sliding friction encountered against the side of the furrow during the plowing operation.

It is a feature of the present invention to provide an improved mold board on a plow which is intended to direct to the side, turn, mix and soften the split and lifted ground of the sliced furrow in a manner reducing the sliding frictional contact of the mold board with the ground thus considerably reducing the necessary tractive power on the part of the pulling tractor.

A further feature of the present invention provides an improved mold board which directs and turns over the ground split by the plow share in the same manner as a mold board of conventional plows in a manner reducing the sliding ground friction therewith thus allowing a reduction in the tractive power of the pulling tractor.

Still a further feature of the present invention provides a novel mold board for a plow which is relatively simple in its construction and which therefore may be readily manufactured at a relatively low cost and by simple manufacturing methods.

Still a further feature of the present invention provides a novel mold board for a plow which reduces the sliding frictional ground engaging contact and which is devoid of moving parts and which therefore is unlikely to get out of order.

Yet still a further feature of the present invention provides a novel friction reducing mold board for a plow which is rugged and durable in construction and which therefore may be guaranteed by the manufacturer to withstand rough usage and to provide uniform soil fracturing of the furrow slice in a manner to throw a smooth unbroken furrow therebehind.

BRIEF DESCRIPTION OF THE DRAWINGS

In the accompanying drawings forming a part of this specification, and in which like reference characters are employed to designate like parts throughout the same:

FIG. 1 is a perspective view of a plow having a mold board mounted thereon and constructed in accordance with the present invention;

FIG. 2 is an enlarged fragmentary front elevational view of a section of the mold board showing the bead projection thereon;

FIG. 3 is a cross-sectional view taken along Line 3—3 of FIG. 2; and

FIG. 4 is a fragmentary perspective view of the top edge portion of a modified mold board constructed in accordance with the present invention.

DESCRIPTION OF THE PREFERRED EMBODIMENTS

Referring now to the drawings in detail and particular to FIGS. 1 to 3 inclusive, a preferred form of a mold board constructed in accordance with the present invention is designated in its entirety by the reference numeral 10 and is illustrated mounted on a plow 11 comprised of a plow share 12, a leading shin wear piece 13, and a supporting frame 14 adapted to be attached to a hitch 15 for attatching to a pulling device, such as a tractor or the like, in a manner to pull the plow through the ground in the direction indicated by arrow 16.

The mold board 10 is formed of a sheet of steel material or the like having a leading edge 21, a trailing edge 22, a top end 23, a bottom end 24, a ground engaging front surface 25, and a back surface 26 which is connected to the frame 14.

The plow share 12 is of a conventional construction having a sole bottom edge 31, a top edge 32, a leading front end edge 33 tapering downwardly and forwardly from the top edge 32 to the bottom edge 31 pointing in the intended direction of travel of the plow 11 and terminating in a share point 34, a trailing share wing end edge 35, an exterior surface 36, and an interior surface 37 which is connected to the frame 14.

The leading shin wear piece 13 is of a size and configuration complementary to the size and configuration of the mold board 10 having a thickness substantially identical to the thickness of the mold board and forming a leading wear edge therefor which is separate from the mold board and adapted for replacement on the frame 14 providing a long life and economy to the mold board as the maximum wear would otherwise be encountered at the front end 21 of the mold board if the shin wear piece were not present on the plow 11. The shin wear piece comprises a curved leading cutting edge 41, a back edge 42 formed complementary to leading edge 21 and adapted to be placed in tight adjacent relationship therewith, a bottom end 43 adapted to be placed in tight adjacent relationship with the leading portion of the plow share top edge 24, a top end 44 adapted to coincide with the top end 23 of the mold board 10, a ground engaging exterior surface 45 adapted to be substantially co-planar with the plane of the surface 25 of the mold board, and a back surface 46 adapted to be co-planar with the back surface 26 of the mold board and which is connected to the frame 14. It is to be understood that the shin piece 13 may taper forwardly from the back edge 21 to the leading cutting edge 41 to assist in the knife cutting action of the plow through the ground.

The mold board is mounted on the frame 14 with the bottom end 32 adjacent the plow share top edge 24 and with the leading edge 42 adjacent the back edge 21 of the shin piece 13, with the mold board and shin piece being of the same curved shape and configuration as conventional mold boards as to projecting upwardly and rearwardly from the plow share with the top edge portion curving outwardly in a direction away from the frame in a manner to throw a smooth furrow during plowing operations with the surface 25 intended to engage the side wall of the furrow slice in a manner to uniformly fracture the furrow slice directing the ground to the side, turning the ground, and mixing the ground in a manner to throw a smooth unbroken furrow therebehind. As the ground must slide past the mold board 10, and even though conventional mold boards are manufactured of steel ground to a mirror finish, the sliding friction in this area of the mold board is quite considerable requiring that the pulling tractive force be sufficient to cut the furrow and overcome such frictional forces.

To reduce the sliding friction there are provided on the surface 25 of the mold board 10 a plurality of spaced apart transversely extending projections 51 which extend in a diagonally forward direction from the top end 23 to the bottom end 24. The projections 51 thus form slight waves in the surface 25 having a short depth and extending therealong with a relatively long pitch with the ground being engaged by the mold board 10 bouncing from projection to projection thereby substantially decreasing the sliding surface friction which would otherwise be encountered by a smooth surface 25, the dirt of the ground thus only momentarily being in contact with the surface 25 before it encounters a projection 51 causing the dirt to bounce outwardly therefrom thus substantially reducing the amount of contact of any particular particle of dirt with the mold board while yet still fracturing the ground and directing the dirt along the mold board in a manner to thoroughly mix the same and throw a smooth unbroken furrow therebehind in the same manner as a conventional mold board.

It is to be noted that the projections 51 extend onto the surface 45 of the shin piece 13 such as illustrated in the drawings to reduce the frictional sliding ground contact of the surface 45 since, essentially, the shin piece 13 forms an integral part of the mold board 10 as to operating therewith, the shin piece in effect providing a replaceable leading cutting edge for the mold board such that after much usage it is only required that the shin piece be replaced without having to replace the more expensive major portion of the mold board.

As seen in FIG. 3, the ridges 51 are preferably in the form of elongated narrow bead like members having a semi-circular cross-section which may be formed integrally with the surface 25 or which may be formed separately therefrom and then suitably secured thereto, such as by welding or the like. The surface 25 and the surface of the ridges 51 are ground as smooth as possible to remove any slight imperfections therein for assuring minimum sliding friction of the dirt thereacross.

Referring to FIG. 4 there is shown a modified form of a mold board 10' having a front ground engaging surface 25', a back surface 26', a top edge 23', and a trailing edge 22', it being understood that the mold board 10' is of the same general size, shape and configuration as the mold board 10 previously described except that rather than provide projections 51 the mold board is formed in an undulatory manner defining a wave like cross-section with diagonally extending ridges 51' having valleys 52' formed therebetween, the ridges and valleys extending diagonally forward from the top edge 23' to the bottom edge of the mold board 10'.

The modified mold board 10' operates to reduce sliding friction in the same manner as the mold board 10 with the dirt having a bouncing movement along surface 25' between ridges 51' thus substantially reducing the sliding friction of the mold board as it slices through the dirt while still throwing a smooth unbroken furrow therebehind in the same manner as a conventional mold board.

It is to be understood that while the present invention is disclosed on a mold board utilized for tilling of the dirt, it may also be incorporated in the blades of bulldozers, excavators, and like machines which work with the dirt. Further, it is to be understood that the unique mold board of the present invention permits the plow to be utilized in different types of soil whereas, up to the present time, it was necessary to change mold boards or complete plows with plows of different construction depending upon the type of ground to be plowed.

The present invention thus provides a novel mold board substantially reducing sliding friction of dirt thereacross as the plow is pulled through the dirt thus permitting a reduction of the tractive power required to pull the plow to permit either more rapid plowing, the pulling of a hitch having additional plows thereon, and the like with the dirt being properly directed to the side, turned, mixed and softened, and then thrown outwardly therefrom in a manner to leave a smooth unbroken furrow behind the plow blade.

It is to be understood that the form of this invention herewith shown and described is to be taken as preferred examples of the same, and that this invention is not to be limited to the exact arrangement of parts shown in the accompanying drawings or described in this specification as various changes in the details of construction as to shape, size, and arrangement of parts may be resorted to without departing from the spirit of the invention, the scope of the novel concepts thereof, or the scope of the sub-joined claims.

Having thus described the invention, what is claimed is:

1. An improved mold board for a plow intended for attachment to a hitch adapted for attachment to a pulling tractor or the like for pulling the plow through the ground to be tilled, the plow having a frame and a plow share mounted on the frame, the improvement comprising a curved sheet of material constituting the mold board of the plow adapted to be mounted on the frame in a position above the plow share and adjacent to the top thereof, the mold board projecting upwardly and rearwardly therefrom with the top edge portion curving outwardly away from the frame in a manner to direct the dirt to the side and turn a smooth furrow behind the plow during the plowing operation, the mold board having a leading edge, a trailing edge, a top end, a bottom end adapted to be disposed adjacent the plow share, a ground engaging front surface, and a back surface adapted to be connected to the frame, and a plurality of uniformly spaced apart diagonally extending equal sized projections formed on the ground engaging front surface extending in a diagonally forward direction from the top end to the bottom end thereof adjacent the plow share top edge.

2. The improved mold board as set forth in claim 1 wherein the projections are formed integrally with the mold board, the mold board having an undulatory horizontal cross-section including uniform diagonally extending recesses formed intermediate adjacent uniform diagonally extending projections and extending completely therealong from the top end to the bottom end thereof in a forward direction.

3. The improved mold board as set forth in claim 1 wherein the uniform diagonally extending projections are in the form of ridges projecting outwardly of the ground engaging front surface of the mold board.

4. The improved mold board as set forth in claim 3 wherein the diagonally extending ridges are each in the shape of elongated bead like members having a semicircular cross-section, the base of each of the bead members being juxtapositioned with the ground engaging front surface and with the body of each of the bead members projecting outwardly from such surface.

5. The improved mold board as set forth in claim 4 further comprising a replaceable shin wear piece adapted to be attached to the frame forwardly of the leading edge of the mold board to provide a replaceable wear surface therefor, the shin piece having a bottom edge adapted to be placed adjacent the front top edge portion of the plow share, a top edge adapted to be aligned with the top edge of the mold board to form a contiguous top edge therewith, a back edge adapted to be adjacently positioned with the leading edge of the mold board, a leading edge forming a cutting surface intended for the initial engagement with the ground during the plowing operation, a back surface connection to the frame, and a ground engaging front surface adapted to lie substantially co-planar with the front surface of the mold board and including thereacross projections which align with the projections on the mold board when the shin piece is disposed adjacent the front leading edge of the mold board.

6. The improved mold board as set forth in claim 2 further comprising a replaceable shin wear piece adapted to be attached to the frame forwardly of the leading edge of the mold board to provide a replaceable wear surface therefor, the shin piece having a bottom edge adapted to be placed adjacent the front top edge portion of the plow share, a top edge adapted to be aligned with the top edge of the mold board to form a contiguous top edge therewith, a back edge adapted to be adjacently positioned with the leading edge of the mold board, a leading edge forming a cutting surface intended for the initial engagement with the ground during the plowing operation, a back surface connected to the frame, and a ground engaging front surface adapted to lie substantially co-planar with the front surface of the mold board and including thereacross projections which align with the projections on the mold board when the shin piece is disposed adjacent the front leading edge of the mold board.

\* \* \* \* \*